Figure 1:
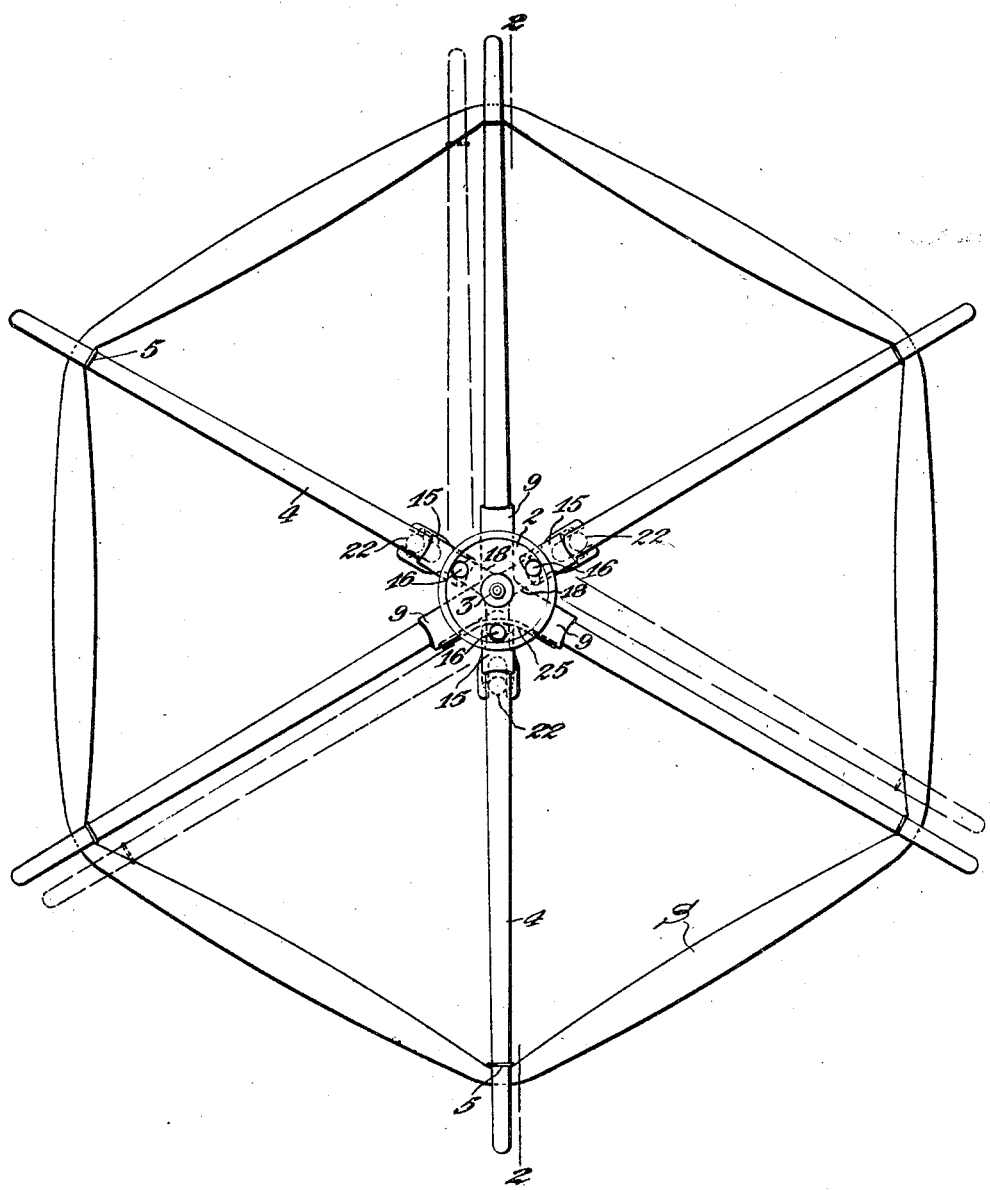

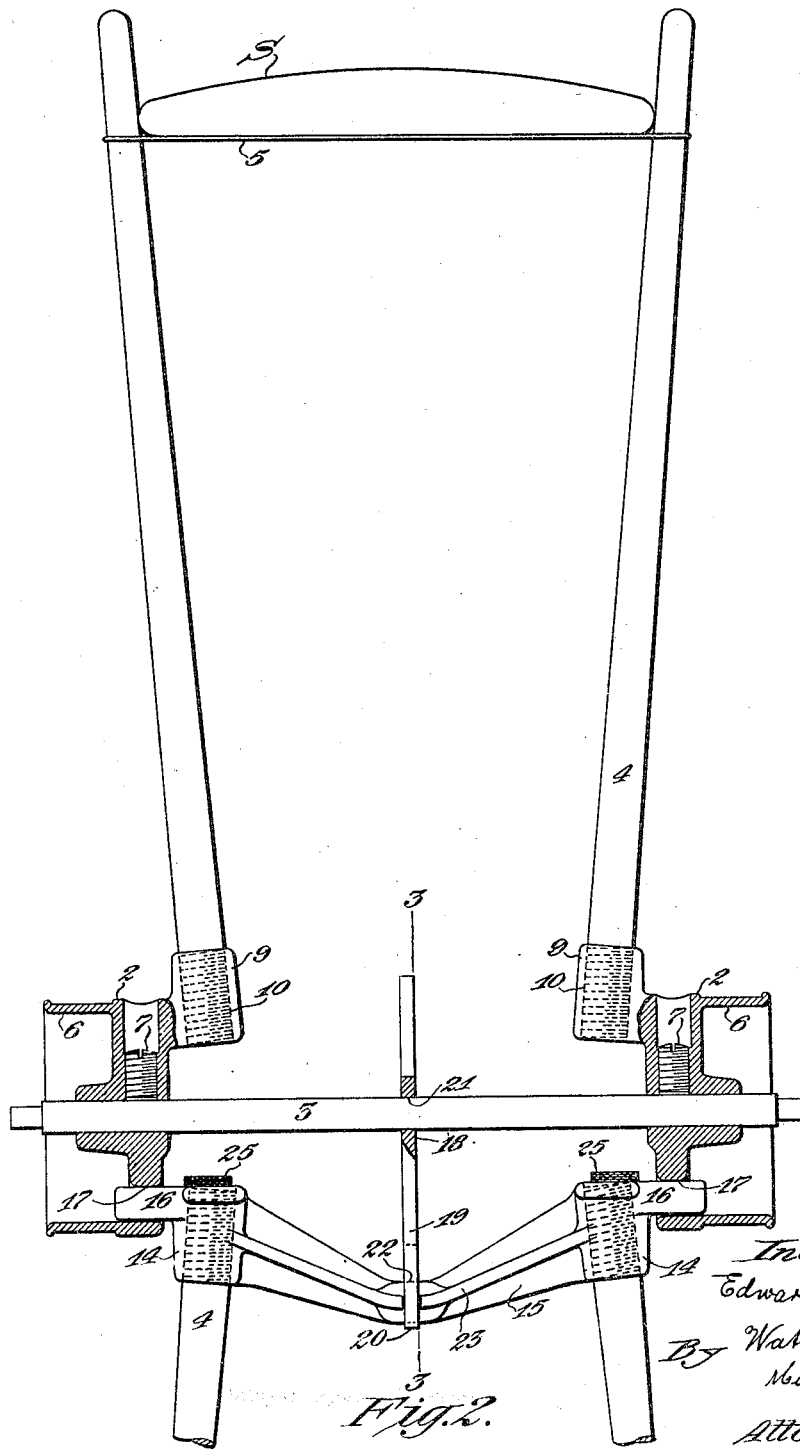

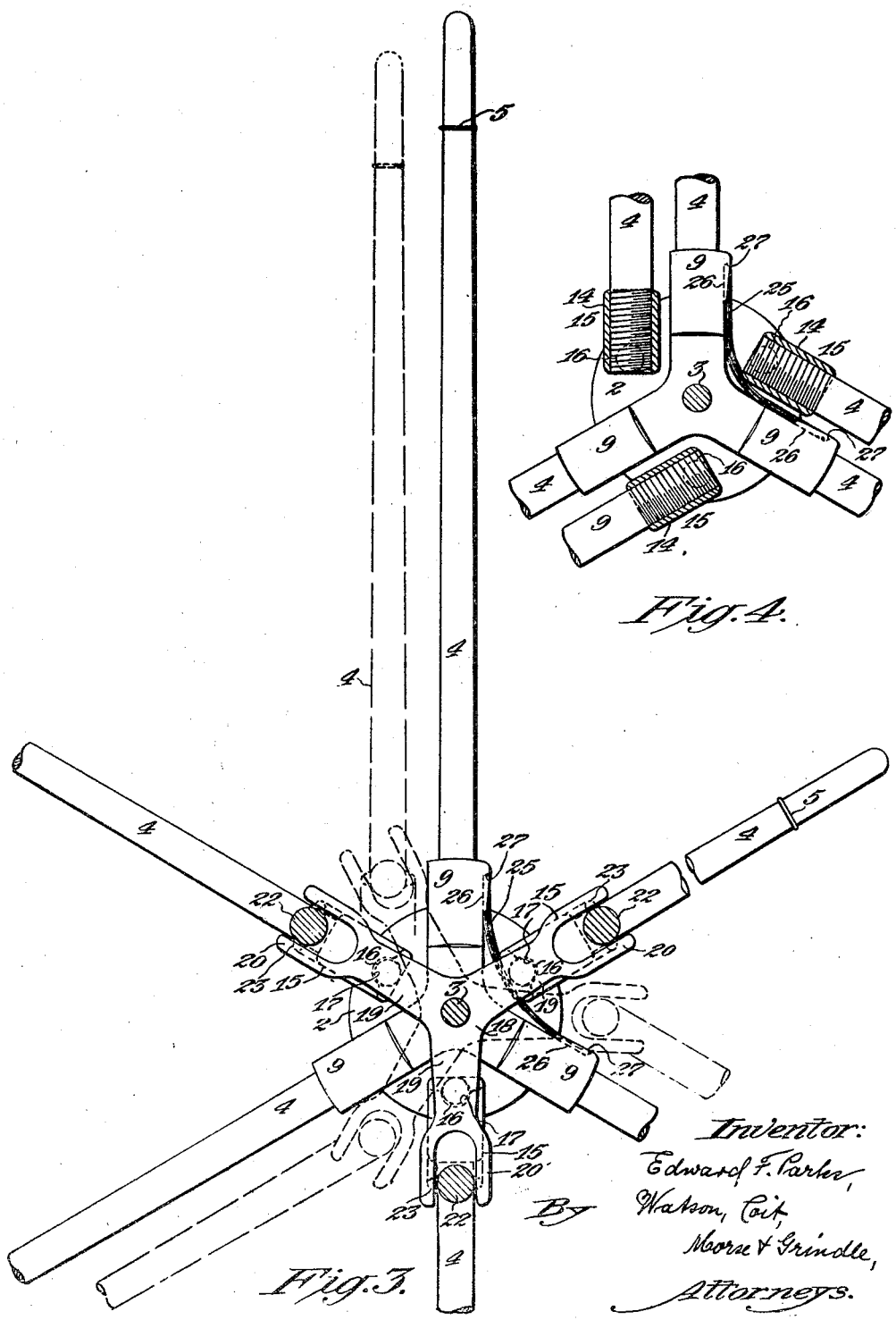

Patented Apr. 15, 1924.

1,490,429

UNITED STATES PATENT OFFICE.

EDWARD F. PARKS, OF PROVIDENCE, RHODE ISLAND, ASSIGNOR, BY MESNE ASSIGNMENTS, TO THE NEW ENGLAND TRUST COMPANY, TRUSTEE, A CORPORATION OF MASSACHUSETTS.

REEL OR SWIFT.

Application filed April 3, 1922. Serial No. 549,132.

*To all whom it may concern:*

Be it known that I, EDWARD F. PARKS, a citizen of the United States, residing at Providence, in the county of Providence, State of Rhode Island, have invented certain new and useful Improvements in Reels or Swifts, of which the following is specification.

This invention relates to improvements in reels or swifts for holding skeins or hanks of yarn, thread and other materials.

One object of the improvement is to provide a device of the type specified which may be easily and quickly contracted to facilitate the placing of the skein thereon.

Another object of the improvement is to provide for automatically returning the parts of the reel to operative relation whereby the skein will be stretched under the proper tension to allow the free delivery or unwinding of the yarn therefrom.

Another object of the improvement is to provide a reel of simple construction and relatively light weight, yet having the required strength and rigidity and being proof against derangement or getting out of order.

Further objects of the improvement are set forth in the following specification which describes a preferred embodiment of the invention as illustrated in the accompanying drawings. In the drawings:

Fig. 1 is a side elevation of my improved reel, showing in dash lines the folded relation of its alternate spokes;

Fig. 2, an enlarged, cross-sectional view of the same taken on the line 2—2 of Fig. 1;

Fig. 3, a part sectional view of the reel taken on the line 3—3 of Fig. 2; and

Fig. 4, a similar view in detail of the folding-mechanism of the reel.

Referring to the drawings, my improved reel or swift comprises in general a pair of spaced hubs 2 connected by an axial shaft or spindle 3 and carrying pairs of opposite radially-projecting spokes 4 which are connected at their outer ends by cross-ties 5 over which the skein S is stretched. The alternate spokes on each side of the reel are pivoted or jointed to the hubs 2 to adapt them to be folded into parallel relation with the relatively fixed spokes, as indicated by the dash lines in Fig. 1 whereby to contract or partly collapse the reel in the manner and for the purpose as later explained.

Referring particularly to Figs. 2 and 3, the hub-members 2 are preferably constructed in the form of cylindrical cups having overhanging flanges 6 which provide brake-rings adapted to receive brake-bands with weights suspended therefrom, or to cooperate with friction means for checking the rotation of the reel. The hubs 2 are mounted on the ends of the axial shaft 3 and secured thereto by means of set-screws 7 which bind thereagainst. The extremities of the shaft 3 project outwardly beyond the flanges 6 on the hubs 2 and, as shown in Fig. 2, are reduced in diameter to provide pintles or gudgeons adapted to rotate in suitable sockets or bearings on the brackets or frames (not shown) from which the reel is supported.

Each hub-member 2 is provided with three equidistantly spaced sockets 9 having interiorly-threaded bores 10 adapted to receive the ends of the radial spokes 4. Usually the spokes 4 consist of tapered wooden sticks having their larger, butt ends adapted to screw into the bores 10 of the sockets 9. The spokes 4 are arranged in paired relation on the two opposite hub-members 2 and those of each pair are connected at their outer ends by a cord tie or wire 5 for supporting the skein S, see Fig. 2.

The alternate pairs of spokes 4 of the reel are screwed into sockets 14 formed on the ends of bridge-pieces or cross-members 15. Projecting from the sides of the sockets 14 are pivot-studs 16 adapted to be received in bores 17 extending transversely through the webs of the hubs 2. In the present arrangement there are three pairs of what may be termed fixed spokes rigidly attached to the hubs 2, and a like number of pairs of movable spokes mounted on the bridge-pieces 15 and hinged or jointed to the hubs by the pivots 16 to adapt the spokes to fold together as indicated by the dash lines in Figs. 1 and 3. It is to be understood, however, that a greater number of spokes may be employed if desired, for instance, the reel might comprise eight pairs of spokes with four pairs rigid on the hubs and four alternate pairs hinged thereto.

The several pairs of folding or movable spokes are maintained in equidistantly spaced relation and caused to move in unison by means of a central spider-element 18, shown in side elevation in Fig. 3. The spider 18 is preferably constructed from flat sheet-metal with three radial arms 19 formed with U-shaped forks 20 at their outer ends. At the center of the spider 18 is an axial hole 21 which receives the shaft 3 to adapt the spider to turn thereon, while the sides of the forks 20 at the ends of the arms of the spider straddle cylindrical bearings 22 formed at the centers of the bridge-members 15. It will be noted from Fig. 2 that the cross-members or bridge-pieces 15 are arched at the center to bring the bearings 22 into offset or eccentric relation to the pivots 16 so that the rocking motion of any one of the cross-members will be communicated through the spider 18 to rock the other members in a manner similar to a crank-action. The forks 20 engage the bearings 22 between the ends of ribs 23 on the bridge-members 15, the ribs thus serving as abutments to hold the spider 18 from side play. Through the above described arrangement the displacement of any one pair of movable spokes relative to the fixed spokes will effect an equal displacement of the other pairs of movable spokes, as illustrated in Fig. 3.

To maintain the several pairs of spokes in their normal extended relation, as shown in the full lines in Fig. 1, one or more springs 25 are arranged to act as next described. Referring to Figs. 2, 3 and 4, a preferred construction provides two springs 25 mounted on the opposite hubs 2 and adapted to act against the sockets 14 of the movable spokes 4. The springs 25 are preferably constructed with a plurality of flat leaves and are held at their ends in slots 26 formed on the sides of the fixed sockets 9. In applying the springs 25 to place they are bent into arcuate form, inserted beneath the ends of the movable sockets 14 and snapped into their slots 26. The ends of the springs abut the ends 27 of the slots 26 which serve as stops to hold them in place under the inherent tension caused by their curvature. In this way the flexed portions of the springs are caused to bear against the flat ends of the sockets 14, thus tending to maintain them in their normal position as shown in Fig. 3. At the same time the springs 25 permit the sockets 14 to be turned on their pivots 16 to provide for folding the spokes of the reel together in the manner as later explained.

To assemble the reel the hub-members 2 are placed on the ends of the shaft or spindle 3 and the bridge-pieces 15 applied to position between them by inserting their trunnions or pivots 16 in the holes 17 in the hubs. Meantime the spider 18 is adjusted to midposition between the hubs 2 with its forked arms 20 engaged with the bearings 22 at the center of the bridge-members 15. The springs 25 are then snapped into their slots 26 in the sockets 9 with their flat faces bearing against the ends of the pivoted sockets 14 so that they tend to normally maintain the spokes of the reel in extended relation. With the parts assembled in this manner the set-screws 7 are tightened against the shaft 3 and the various elements will thus be held in coöperative relation as shown in Figs. 2 and 3; it being understood that the spokes 4 are applied to use by screwing their butt ends into the sockets 9 and 14 and then connecting their outer ends in pairs by means of the ties 5.

To contract or partly collapse the reel any two adjacent spokes on either side are grasped between the fingers and folded toward each other by swinging the hinged or movable spokes on the pivots 16 of their cross-members or bridge-pieces 15. The folding movement of one pair of spokes rocks its cross-member or bridge-piece 15 to rotate the spider 18 on the axis of the spindle 3 and in this way a corresponding rocking action is communicated to the other cross-members which carry the several pairs of movable spokes. The alternate pairs of movable spokes are thus caused to be brought into substantially parallel, adjacent relation to the fixed spokes, as illustrated by the dash lines in Fig. 3. It will be seen that through this action the reel will be partly collapsed so that there will be a considerable contraction in its perimeter due to the drawing together of the end-ties or cross-cords 5 of the alternate pairs of its spokes, and this contraction allows the skein or hank of yarn to be conveniently placed around the reel. As the spokes are brought together in folded relation the flat ends of the pivoted sockets 14 slide across the faces of the springs 25 and the latter are caused to flex in the manner illustrated in Fig. 4, while still exerting a pressure on the sockets tending to turn them back into first position again.

After the skein has been slipped on over the cross-ties 5 of the spokes 4 it is only necessary to release the spokes when they will be swung back into open or extended relation again under the action of the springs 25. In this manner the reel is expanded or returned to normal, extended position automatically without exertion on the part of the operator. As the spokes of the reel spring back to extended relation they take up the slack in the skein and stretch it across the cross-ties 5 so that the strands of yarn or thread are straightened and drawn into alinement whereby to facilitate the unwinding of the material as the reel is rotated on its axis in the usual manner.

It will be observed from the foregoing that my improvement provides a particularly simple and compact device which, while being of relatively light weight, is nevertheless staunch and rigid and capable of sustaining considerable stress and strain on its parts. My improved reel may be very conveniently contracted or partly collapsed to adapt it to receive the skein and is automatically expanded to open position again so that its use facilitates the handling of the skein with an economy of time and effort, while also providing for a freer and easier delivery of the yarn therefrom.

While I have herein described and illustrated one preferred embodiment of my improvement it is to be understood that various modifications may be made in the construction and arrangement of the parts of the device without departing from the spirit or scope of the invention; therefore, without limiting myself to the exact structure herein disclosed, I claim:

1. In a reel or swift, the combination with hub members, of a series of fixed spokes radiating therefrom, a series of movable spokes pivoted to the hub-members between the fixed spokes to adapt them to fold into closed relation therewith, and a single element connecting all of the movable spokes to adapt them to be operated in unison.

2. In a reel or swift, the combination with a pair of opposite hub-members, of cross members pivotally mounted between the hub-members, a series of fixed spokes extending radially from the hub-members, a second series of movable spokes carried by the cross-members to adapt them to fold into closed relation with respect to the fixed spokes, and a single element for connecting the cross-members to adapt their spokes to be moved in unison.

3. In a reel or swift, the combination with hub-members, of a series of rigid spokes radiating therefrom, a series of movable spokes pivoted on the hub-members to adapt them to fold into closed relation with respect to the rigid spokes, and relatively flat leaf-springs acting on the movable spokes to normally maintain the latter in open relation with respect to the rigid spokes.

4. In a reel or swift, the combination with a pair of spaced-apart hub-members, of a series of radial spokes fixedly mounted in paired arrangement on the hub-members, a series of pairs of alternate spokes pivoted on the hub-members in eccentric relation to the axis thereof to adapt them to fold into closed relation to the fixed spokes and a single element connecting the several pairs of movable spokes to effect a concurrent action thereof.

5. In a reel or swift, the combination with opposite hub-members, of a series of pairs of spokes rigidly supported therefrom, a series of pairs of movable spokes pivotally mounted on the hub-members to adapt them to fold into closed relation to the rigid spokes, and a member rotatable on the axis of the hub and connected to the movable spokes to cause them to move together in unison.

6. In a reel or swift, the combination with two opposite hub-members, of a series of spokes rigidly supported on the hub-members, rockable cross-members pivoted between the hub-members, a series of foldable spokes carried by the cross-members, and a spider rotatable on the axis of the hub-members and engaging the cross-members to connect the latter to rock in unison.

7. In a reel or swift, the combination with a pair of spaced-apart hub-members having radial sockets, of a series of spokes held in said sockets, rockable cross-members pivoted between the hub-members and provided with sockets at their ends, spokes held in the sockets of the cross-members, a member rotatable on the axis of the hub-members and engaging the cross-members to connect them to rock in unison, and means for normally maintaining the cross-members in position with their spokes extending in equidistantly spaced relation to the rigid spokes.

8. In a reel or swift, the combination with a spindle, of opposite hub-members secured to the ends of the spindle, cross-members extending between the hub-members and pivoted thereto at their ends, a series of fixed spokes extending radially from the hub-members, a second series of spokes carried by the cross-members in alternate arrangement with the fixed spokes, and a member rotatable on the spindle and connected to the several cross-members at points in eccentric relation to their pivots.

9. In a reel or swift, the combination with hub-members, of a series of fixed spokes extending radially therefrom, rockable socket-members pivoted between the hub-members in alternate arrangement with the fixed spokes, foldable spokes carried by said socket-members, and springs carried by the hub-members and acting on the socket-members to maintain them in position with their spokes projecting in equidistantly spaced relation to the fixed spokes.

10. In a reel or swift, the combination with a pair of opposed hub-members, of a series of rigid spokes radiating therefrom, a plurality of socket-members pivoted to the hub-members, spokes extending from said socket-members in alternate arrangement with the rigid spokes, and springs bearing against flat faces on the socket-members to normally maintain the latter in position with their spokes spaced equidistantly between the rigid spokes.

In testimony whereof I hereunto affix my signature.

EDWARD F. PARKS.